United States Patent [19]
Higby et al.

[11] Patent Number: 5,747,398
[45] Date of Patent: May 5, 1998

[54] NEUTRAL COLORED GLASS COMPOSITIONS

[75] Inventors: Paige L. Higby; Dean E. Vernacotola, both of Maumee; Bret E. Penrod, Toledo, all of Ohio

[73] Assignee: Libbey-Owens-Ford Co., Toledo, Ohio

[21] Appl. No.: 744,242

[22] Filed: Nov. 5, 1996

[51] Int. Cl.$^6$ .................. C03C 3/087; C03C 6/04; C03C 6/00
[52] U.S. Cl. .................. 501/66; 501/68; 501/70; 501/72; 501/69; 501/904; 501/905
[58] Field of Search ............. 501/68, 70, 72, 501/69, 904, 905, 66

[56] References Cited

U.S. PATENT DOCUMENTS

| | | | |
|---|---|---|---|
| 4,701,425 | 10/1987 | Baker et al. | 501/70 |
| 5,264,400 | 11/1993 | Nakaguchi et al. | 501/70 |
| 5,278,108 | 1/1994 | Cheng et al. | 501/71 |
| 5,318,931 | 6/1994 | Nakaguchi et al. | 501/70 |
| 5,320,986 | 6/1994 | Taniguchi et al. | 501/70 |
| 5,346,768 | 9/1994 | Winter et al. | 501/70 |
| 5,364,820 | 11/1994 | Morimoto et al. | 501/70 |
| 5,380,685 | 1/1995 | Morimoto et al. | 501/70 |
| 5,411,922 | 5/1995 | Jones | 501/70 |
| 5,478,783 | 12/1995 | Higby et al. | 501/71 |
| 5,558,942 | 9/1996 | Itoh et al. | 501/70 |

*Primary Examiner*—Michael Marcheschi
*Attorney, Agent, or Firm*—Marshall & Melhorn

[57] ABSTRACT

A solar heat reducing and ultraviolet absorbing soda-lime-silica glass of a neutral tint and high visible light transmittance. The glass has the essential colorants of from about 0.1 to about 0.7 weight percent $Fe_2O_3$ (total iron), and either from about 0.1 to about 1.0 weight percent of a compound selected from the group consisting of titanium dioxide, vanadium pentoxide, and ceric oxide, or alternatively from about 0.1 to about 2.0 weight percent of a combination of colorants selected from the group, and having a ferrous value of less than 35 percent.

3 Claims, No Drawings

NEUTRAL COLORED GLASS COMPOSITIONS

BACKGROUND OF THE INVENTION

1. Field of the Invention

This application is claiming the benefit, under U.S.C. §119(e), of the provisional application filed Dec. 11, 1995 under 35 U.S.C. §111(b), which was granted a Ser. No. 60/008,451. The provisional application, 60/008,451, is hereby incorporated by reference.

This invention relates to a neutral colored glass that has a high visible light transmittance, a reduced total solar heat transmittance, and a reduced ultraviolet radiation transmittance. More particularly, this invention relates to a glass composition that utilizes colorants of iron oxide and one or more of the compounds selected from the group of titanium dioxide, vanadium pentoxide, or ceric oxide to produce a glass suitable for use in architectural glazings.

2. Summary of Related Art

A glass composition has been developed for use in glazings which has a reduced direct solar heat transmittance (DSHT) and a reduced ultraviolet radiation transmittance (UVT) while permitting a desirable visible light transmittance. Although not limited to a particular use, the neutral colored glass of the present invention exhibits a combination of properties that make it highly desirable for use in architectural applications. The glass composition of the present invention reduces the problems caused by excessive heating on sunny days, and protects interior furnishings in the home or office from the degradation caused by ultraviolet radiation. Moreover, the high visible light transmittance and the neutral color permit a high visibility through the glass which is desirable for glazings in homes. The glasses of the present invention have color co-ordinates, as defined in the CIELAB Illuminant C two degree observer system, lying in the ranges a* from −7 to 0, b* from −2 to +4. The term "neutral tint" is hereinafter used to describe glasses having such color co-ordinates. The present composition is compatible with conventional flat glass manufacturing methods.

Glasses having reduced direct solar heat transmittance properties are usually produced by adding $Fe^{2+}$ to the glass which generally results in a glass having a blue color. Additionally, the amount of $Fe^{3+}$ present in the composition, or the inclusion of compounds such as Ti, V, or Ce, improve the ultraviolet radiation absorption of the glass. However, the presence of $Fe^{3+}$, Ti, V, or Ce in the glass composition tend to color the glass yellow because of the significant amounts needed to obtain the absorption properties.

Accordingly, if both good UV absorption and reduced direct solar heat transmittance are required in the same glass, the color of such glass is, almost inevitably, either green or blue, which reduces the visible transmittance of the glass. When the color of the glasses is defined by the CIELAB system, such commercial glasses, in 4 mm thickness and having greater than 60% light transmission, are found to be either very green (—a*>8) or very blue (—b*>7), neither of which are currently desirable from an aesthetic viewpoint.

It would be an advantage to provide a neutral colored glass composition that has a reduced direct solar heat transmittance and a reduced ultraviolet radiation transmittance while permitting a high level of visible light transmittance. A glass comprising those specific properties is ideally suited for architectural glazings. The neutral color and the high visible light transmittance are desirable for glazings in homes. Furthermore, the reduced transmittance properties would prevent excessive heating on sunny days, and protect interior furnishings in the home or office from the degradation caused by ultraviolet radiation.

SUMMARY OF THE INVENTION

According to the present invention, there is provided a solar heat reducing and ultraviolet radiation absorbing soda-lime-silica glass of a neutral tint (as herein defined) having, in a nominal 3 mm thickness, a visible light transmission of at least 80%, a direct solar heat transmission from about 50% to about 81%, and a UV transmission of about 50% to about 78%[1].

The glass of the present invention is tinted to a neutral color by the inclusion of iron oxide and one or more compounds selected from the group of titanium dioxide, vanadium pentoxide, and ceric oxide. The composition comprises a soda-lime-silica base glass and a total iron content, expressed as $Fe_2O_3$, in the range of from about 0.1 to about 0.7% by weight. The ferrous iron to total iron content of the composition is less than 35% (i.e., percent of total iron as ferrous iron (FeO) less than 35%[2]).

A single colorant, selected from the group of titanium dioxide, vanadium pentoxide, and ceric oxide, is added to the glass composition at about 0.1% to about 1.0% by weight. Optionally, a combination of compounds selected from the group of colorants may also be added to the glass composition from about 0.1% to about 2.0% by weight. Amounts of the colorants in the above ranges can produce beneficial effects on color purity and UV absorption, respectively, without deleteriously

|  |  |
| --- | --- |
| Ultraviolet | 300–400 nanometers |
| Visible | 400–770 nanometers |
| Total Solar | 300–2130 nanometers |

[1] Radiation transmittance results are based upon the following wavelength ranges:

[2] As is well known, the iron content in glasses is usually present in both the $Fe_2O_3$, (ferric) and FeO (ferrous) forms. As is conventional, the total amount of iron present in a glass is expressed herein as $Fe_2O_3$, regardless of the form actually present, influencing the unique and highly advantageous properties of the novel glass.

For the purpose of the present specification and claims, references to visible light transmittance are to light transmittance (LT) measured using the Illuminant C standard; UVT or ultraviolet radiation transmittance is an integrated term representing the area under the transmittance versus wavelength curve for wavelengths between 300 and 400 nm integrated at 5 nm intervals, using a trapezoidal integration method; and references to direct solar heat transmittance (DSHT) are references to solar heat transmittance integrated over the wavelength range 350 to 2100 nm according to the relative solar spectral distribution Parry Moon for air mass 2.

Unless otherwise noted, the term percent (%) as used herein and in the appended claims, means percent (%) by weight. Percent reduction of total iron was determined by first measuring the radiant transmission of a sample at a wavelength of 1060 nanometers, using a spectrophotometer.

DETAILED DESCRIPTION OF THE PREFERRED EMBODIMENT

In many architectural glass applications, it is desirable to maintain a certain visible light transmittance level, for example greater than 80%, to allow for adequate vision therethrough by building occupants. At the same time, it is advantageous to reduce the solar transmittance and ultraviolet radiation transmittance. The higher the solar transmittance, the higher the heat load will be inside the building, and consequently the higher the load will be on air conditioning systems. Ultraviolet radiation is to be filtered out as much as possible in order to avoid, among other things, degradation of colors in the carpeting and fabrics inside the building.

The batch compositions of the present invention, when used to produce glass having a total glass thickness of about 3 mm, can exhibit an Illuminant C visible light transmittance value greater than 80% and a neutral tint, as defined in the CIELAB Illuminant C two degree observer system, lying in the ranges a* from −7 to 0, b* from −2 to +4, and having an L* value greater than 86, preferably greater than 92. Furthermore, the compositions result in a reduced direct solar heat transmittance of about 50% to about 81% and a reduced ultraviolet radiation transmittance of about 50% to about 78%. The solar heat transmittance and the ultraviolet radiation transmittance values are substantially lower than any compositions having a neutral color and similar visible transmittance values disclosed in the prior art.

Suitable batch materials for producing glasses according to the present invention include sand, limestone, dolomite, soda ash, salt cake or gypsum, niter, iron oxide, and carbon. Additionally, conventional sources for the titanium dioxide, vanadium pentoxide, and ceric oxide colorants are suitable for use in the present glass composition. The noted materials may be compounded by conventional glass batch ingredient mixing devices.

The batch materials are conveniently melted together in a conventional glass making furnace, to form a neutral tinted glass composition, which thereafter may be continuously cast onto the molten metal bath in a float glass process.

The composition of soda-lime-silica flat glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |

Other minor ingredients, including melting and refining aids such as $SO_3$, may also appear in the glass composition. The coloring constituents of the present invention set forth above are added to this base glass. The glass is essentially free of colorants other than iron and one or more of the compounds selected from the group of titanium dioxide, vanadium pentoxide, or ceric oxide, other than any trace amounts of oxides that may be present as impurities.

In accordance with the present invention, the iron oxide is added such that the total iron content, expressed in $Fe_2O_3$, is in the range of about 0.1% to about 0.7% by weight. The ferrous iron to total iron content of the composition is less than 35%. The glass composition also includes one or more colorants selected from the group of titanium dioxide, vanadium pentoxide, or ceric oxide. A single colorant may be added to the composition from about 0.1% to about 1.0% by weight. A combination of two of the colorants, or a combination of all three, may be added to the glass composition from about 0.1% to about 2.0% by weight.

Accordingly, the glass of the present invention may be melted and refined in a conventional tank-type melting furnace and formed into flat glass sheets of varying thicknesses by the float method in which the molten glass is supported on a pool of molten metal, usually tin, as it assumes a ribbon shape and is cooled.

The glass compositions produced in accordance with the present invention are particularly suited for use as architectural glazings. The compositions provide a desirable neutral color and visible light transmittance while reducing the solar heat transmittance and the ultraviolet transmittance.

The field of tinted glasses is one in which relatively small changes can produce major changes in tint. Wide ranges disclosed in prior patents can encompass many possibilities, and it is only the teaching of the specific examples that can be relied on as identifying how particular tints associate with particular ranges of solar heat transmittance and ultraviolet radiation absorption.

The following examples in Table I illustrate glass compositions in accordance with the invention that are readily formed into neutral colored glass articles or glazings. Each example includes a soda-lime-silica base glass composition prepared in accordance with the present invention. The specific colorant compositions are noted for each example. The resulting glass compositions have an Illuminant C visible light transmission of at least about 80%, a direct solar energy transmittance between about 50% to about 81%, and an ultraviolet radiation transmittance of about 50% to about 78%.

The examples illustrate but do not limit the invention. In the examples, all parts and percentages are by weight and:

(a) $Fe_2O_3$, FeO, and $TiO_2$, $V_2O_5$, and $CeO_2$ are expressed in percent;

(b) total iron is expressed as if all iron present were present as ferric oxide; and (c) the FeO content is calculated from the equation $$\% FeO = \frac{\% FeO^{2+}}{100} \times Fe_2O_3 \times \frac{143.7}{159.7}$$

$Fe_2O_3$ = percentage total iron, expressed as $Fe_2O_3$, in the glass (143.7 being the molecular weight of 2×FeO and 159.7 being the molecular weight of $Fe_2O_3$).

(d) The transmittance data in the Table below and throughout are based on a nominal glass thickness of 3 mm.

| | | | | | at 3 mm: | | | | | |
|---|---|---|---|---|---|---|---|---|---|---|
| Example # | $Fe_2O_3$ | $TiO_2$ | $CeO_2$ | $V_2O_5$ | Ferrous | DSHT | TUV(₅t) | Ill.C | L* | a* | b* |
| Example 1 | 0.3 | 0.1 | 0.1 | 0.0 | 15.0 | 79.6 | 67.2 | 88.5 | 95.37 | −1.75 | 0.42 |
| Example 2 | 0.4 | 0.2 | 0.2 | 0.0 | 12.6 | 77.7 | 59.5 | 87.4 | 94.92 | −2.15 | 1.17 |
| Example 3 | 0.7 | 0.1 | 0.0 | 0.0 | 12.0 | 71.0 | 52.0 | 85.1 | 93.92 | −3.42 | 2.25 |

-continued

| | | | | | at 3 mm: | | | | | | |
|---|---|---|---|---|---|---|---|---|---|---|---|
| Example # | Fe$_2$O$_3$ | TiO$_2$ | CeO$_2$ | V$_2$O$_5$ | Ferrous | DSHT | TUV($_5$t) | Ill.C | L* | a* | b* |
| Example 4 | 0.5 | 1.0 | 0.0 | 0.0 | 14.1 | 72.4 | 52.3 | 85.0 | 93.88 | −3.44 | 3.11 |
| Example 5 | 0.6 | 0.5 | 0.0 | 0.0 | 12.5 | 71.3 | 52.6 | 84.8 | 93.78 | −3.42 | 2.49 |
| Example 6 | 0.2 | 0.0 | 0.0 | 0.1 | * | 76.9 | 50.3 | 76.6 | 94.31 | −4.24 | 2.12 |
| Example 7 | 0.4 | 0.1 | 0.2 | 0.0 | 13.6 | 77.1 | 59.8 | 87.2 | 94.84 | −2.20 | 1.10 |
| Example 8 | 0.5 | 0.1 | 0.0 | 0.0 | 31.5 | 58.7 | 62.1 | 82.0 | 92.56 | −4.83 | −1.28 |
| Example 9 | 0.1 | 0.3 | | | 33.0 | 80.9 | 75.6 | 89.1 | 95.63 | −1.48 | −0.03 |
| Example 10 | 0.2 | 0.5 | | | 28.0 | 78.2 | 71.9 | 88.0 | 95.16 | −1.92 | 0.03 |
| Example 11 | 0.2 | 0.6 | | | 25.2 | 78.3 | 71.2 | 88.4 | 95.33 | −2.00 | 0.51 |
| Example 12 | 0.2 | 0.8 | | | 26.5 | 77.0 | 69.0 | 87.9 | 95.12 | −2.26 | 0.76 |
| Example 13 | 0.2 | 0.8 | | | 24.3 | 77.9 | 70.0 | 88.1 | 95.21 | −2.07 | 0.62 |
| Example 14 | 0.3 | 0.9 | | | 26.2 | 69.3 | 58.0 | 86.8 | 94.66 | −2.60 | 1.26 |

*The ferrous value is not included because vanadium pentoxide affects the measurement of ferrous oxide in the glass composition.

This description of the invention has been made with reference to specific examples, but it should be understood that variations and modifications as are known to those of skill in the art may be resorted to without departing from the scope of the present invention.

What is claimed is:

1. A neutral colored soda-lime-silica glass composition comprising on a weight percent basis: 65–80% SiO$_2$, 10–20% Na$_2$O, 5–15% CaO, 0–10% MgO, 0–5% Al$_2$O$_3$, 0–5% K$_2$O, 0–5% B$_2$O$_3$ and 0–5% BaO and colorants consisting essentially of from about 0.1 to about 0.7 weight percent Fe$_2$O$_3$ (total iron), and either from about 0.1 to about 1.0 weight percent of a compound selected from the group consisting of titanium dioxide, vanadium pentoxide, and ceric oxide, or alternatively from about 0.1 to about 2.0 weight percent of a combination of colorants selected from said group, and having a ferrous value of less than 35 percent, wherein said glass, at a nominal 3 millimeter thickness, has a visible light transmittance (Illuminant C) of at least 80%, and a direct solar heat transmittance of about 50 to about 81%.

2. A glass as defined in claim 1, having a color defined by the following CIELAB coordinates: a* from −7 to 0; b* from −2 to 4; L* greater than 86.

3. A glass as defined in claim 1, wherein said glass has an ultraviolet radiant transmittance of about 50 percent to about 78 percent.

* * * * *